United States Patent [19]

Saxon

[11] 4,158,111

[45] Jun. 12, 1979

[54] EXCLUSION SYSTEM FOR A KEY TELEPHONE SYSTEM

[75] Inventor: Bruce R. Saxon, Harrisburg, Pa.

[73] Assignee: International Telephone & Telegraph Corp., Nutley, N.J.

[21] Appl. No.: 869,392

[22] Filed: Jan. 13, 1978

[51] Int. Cl.² .............................................. H04Q 5/20
[52] U.S. Cl. ................................ 179/99 A; 179/17 B; 179/39; 179/99 E; 179/99 P
[58] Field of Search .................. 179/99, 18 R, 18 RA, 179/18 DA, 18 AD, 17 B, 39

[56] References Cited

U.S. PATENT DOCUMENTS

| | | | |
|---|---|---|---|
| 3,872,262 | 3/1975 | Kerman | 179/99 |
| 3,941,943 | 3/1976 | Matheny | 179/99 |
| 3,961,144 | 6/1976 | Hirate | 179/99 |
| 4,000,376 | 12/1976 | Springer | 179/99 |
| 4,021,621 | 5/1977 | Wycheck | 179/99 |
| 4,053,720 | 10/1977 | Wycheck et al. | 179/99 |
| 4,075,434 | 2/1978 | Merritt, Jr. | 179/99 |
| 4,081,624 | 3/1978 | Kerman et al. | 179/99 |
| 4,117,274 | 9/1978 | Cannon et al. | 179/99 |

Primary Examiner—Kathleen H. Claffy
Assistant Examiner—Gerald L. Brigance
Attorney, Agent, or Firm—John T. O'Halloran; Alfred C. Hill

[57] ABSTRACT

The exclusion system is employed with a central office/private branch exchange (CO/PBX) system and a party line paging and intercom system. A first circuit is coupled to the "A" lead of the party line system and is responsive to a predetermined potential on this "A" lead to couple a tip conductor and a ring conductor of an associated subset of the party line system to the tip and ring conductors of a selected one of the CO/PBX system and the party line system. A second circuit is coupled to the "A" lead of the party line system to manually generate a first exclusion potential for the party line system to exclude subsets not already connected to the party line system. A third circuit is coupled to the "A" lead of the CO/PBX system and is responsive to a given potential on this "A" lead to automatically produce a second exclusion potential on this "A" lead to exclude subsets not already connected to the CO/PBX system.

31 Claims, 1 Drawing Figure

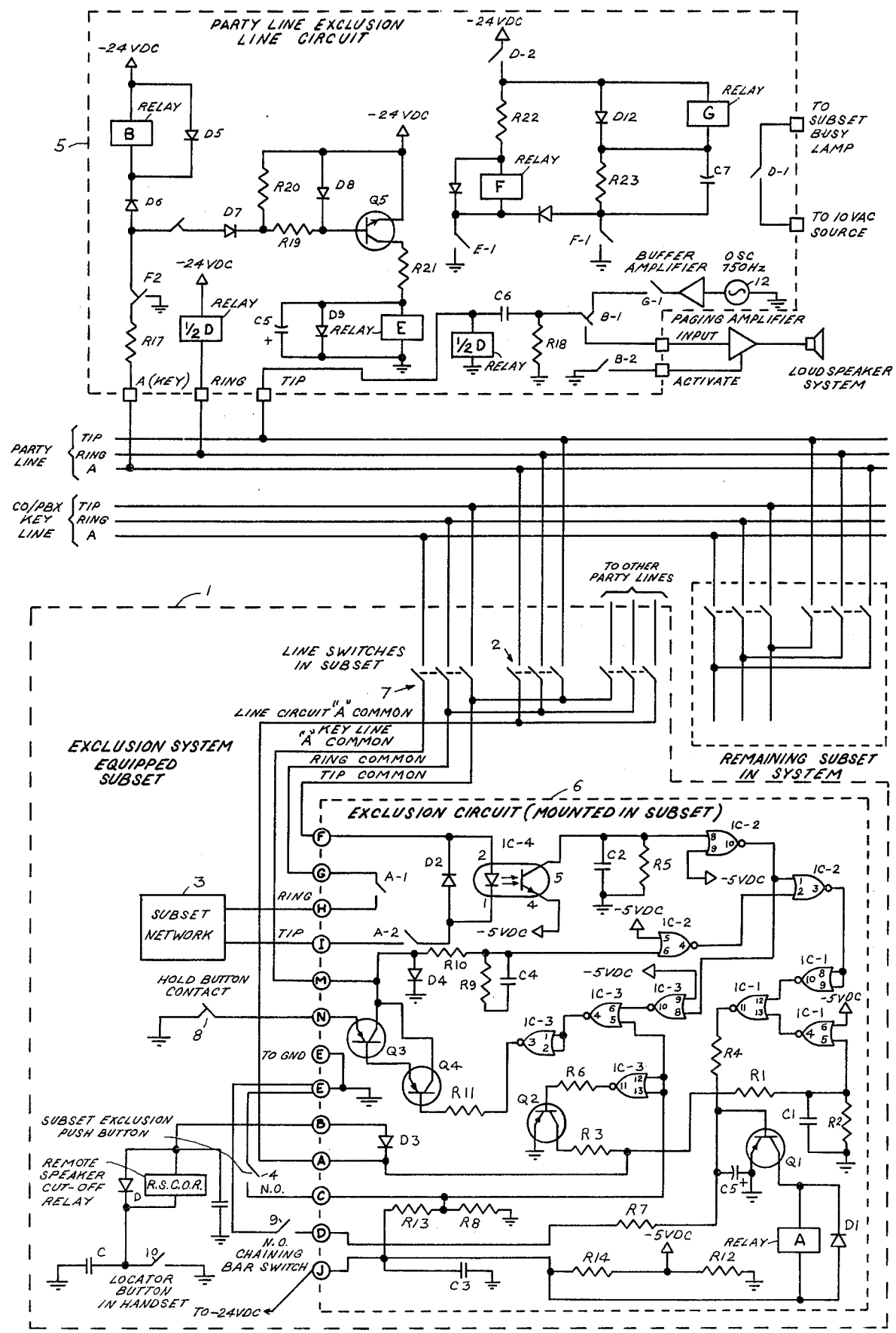

EXCLUSION SYSTEM FOR A KEY TELEPHONE SYSTEM

BACKGROUND OF THE INVENTION

This invention relates to key telephone systems and more particularly to an exclusion system for such telephone systems.

Prior art exclusion systems employ circuitry that either senses the potential on the subset's "A" lead or senses voltage across the subset's tip conductor and ring conductor. These signals are then amplified or used directly to close the subset's tip conductor and ring conductor common circuit.

Prior art exclusion systems provide privacy for the central office/private branch exchange (CO/PBX) key lines only. These prior art exclusion systems have not been designed to provide privacy on common path or party line paging and intercom systems. Exclusion systems that sense the voltage between the tip conductor and ring conductor are unreliable in as much as variation in cable lengths can cause intermittent operation. Other exclusion systems frequently contain large electromechanical relays which are costly and prone to contact contamination, reduced life expectancy, and slow operating speed. These exclusion systems also employ discrete circuitry, and when combined with the electromechanical relays, substantial amounts of operating current are required, often in the order of 35 ma (milliamperes) to 50 ma per unit.

SUMMARY OF THE INVENTION

An object of the present invention is to provide an exclusion system for a CO/PBX system and party line paging an intercom system of a key telephone system which overcomes the disadvantages of the above-mentioned prior exclusion systems.

A feature of the present invention is the provision of an exclusion system for a CO/PBX system and party line paging and intercome system, the CO/PBX system having an "A" lead, a tip conductor and a ring conductor and the party line system having an "A" lead, a tip conductor and a ring conductor comprising: first means coupled to the "A" lead of the party line system responsive to a predetermined potential on the "A" lead of the party line system to couple a tip conductor and a ring conductor of an associated subset of the party line system to the tip and ring conductors of a selected one of the CO/PBX system and the party line system; second means coupled to the "A" lead of the party line system to manually generate a first exclusion potential for the party line system to exclude subsets not already connected to the party line system; and third means coupled to the "A" lead of the CO/PBX system responsive to a given potential on the "A"]lead of the CO/PBX system to automatically produce a second exclusion potential on the "A" lead of the CO/PBX system to exclude subsets not already connected to the CO/PBX system.

An exclusion system of the present invention provides privacy for both CO/PBX systems and party line paging and intercom systems. The circuitry employs CMOS (complementary metal oxide semiconductor) logic which requires very low operating currents. System conditions are sensed via the subset's "A" lead of both the CO/PBX system and the party line system, and in combination with the low current requirements of the CMOS logic, the system is insensitive to variations in cable lengths. The exclusion system of the present invention employs one reed relay whose sealed contacts are impervious to contamination and has a long life expectancy. The reed relay is very sensitive and thus requires a small amount of current for operation. In fact, the exclusion system of the present invention draws only 8.5 ma when operating.

BRIEF DESCRIPTION OF THE DRAWING

Above-mentioned and other features and objects of this inventon will become more apparent by reference to the following description taken in conjunction with the accompanying drawing, in which the single FIGURE is a schematic diagram partially in block form of the exclusion system in accordance with the principles of the present invention.

DESCRIPTION OF THE PREFERRED EMBODIMENT

Referring to the FIGURE the exclusion system equipped subset 1 has a terminal A of the exclusion circuit 6 connected to the party line "A" lead (key) common of the associated subset. Prior to any party line line button being depressed, pin 5 of integrated circuit IC-1 is held at ground potential (logic "1") via resistor R2. Pin 6 of integrated circuit IC-1 is held directly at −5 VDC (logic "0"). Since all integrated circuits employed in the present invention contain NOR gate logic, pin 4 of integrated circuit IC-1 will be −5 VDC (logic "0"). Pin 4 of integrated circuit IC-1 is connected to pin 13 of integrated circuit IC-1. As described later, pin 12 of integrated circuit IC-1 is also at −5 VDC (logic "0"). Therefore, pin 11 of integrated circuit IC-1 is at ground (logic "1") which cut-off biases transistor Q1 via resistor 4. Relay A, of course, cannot operate.

When a party line line switch 2 of an associated subset is depressed, the "A" contact of line switch 2 connects a −24 VDC path from the party line exclusion line printed circuit 5 card's "A" key circuit to exclusion terminal A. With a −24 VDC at terminal A, the voltage divider formed by resistors R1 and R2 and the impedance of the logic gate input produces a −5 VDC (logic "0") at pin 5 of integrated circuit IC-1. Together with the logic "0" at pin 6 of integrated circuit IC-1, pin 4 now produces a logic "1". The logic "1", in turn, appears at pin 13 of integrated circuit IC-1 which produces a logic "0" at pin 11. This logic "0" or −5 VDC forward biases transistor Q1 via resistor R4. Transistor Q1 amplifies the base signal and operates relay A.

When relay A operates, its contacts A-1 and A-2 close which completes a circuit from the subset network 3 tip and ring conductors. A direct current loop is now established from a party line line card to network 3 via the tip and ring contacts of line switch 2, hook switch (not shown) of subset network 3, relay contacts A-1 and A-2 and optical coupler IC-4. Current flow in the tip conductor activates the LED (light emitting diode) portion of optical conductor IC-4 which, in turn, optically forward biases the phototransistor portion of optical coupler IC-4. Pin 8 of integrated circuit IC-2 is normally held at ground potential (logic "1") via resistor 5. Since pin 9 of integrated circuit IC-2 is held at −5 VDC (logic "0"), the NOR gate output, pin 10, is a logic "0." Pin 10 of integrated circuit IC-2 is connected to pin 1 of integrated circuit IC-2, thus, a logic "0" appears here as well. As described later, pin 2 of intergrated circuit IC-2 is held at logic "0." Since both NOR gate inputs are logic "0"s, the output (pin 3) is a logic "1." This logic "1" appears at pins 8 and 9 of integrated circuit IC-1, which generates a logic "0" at pin 10 and subsequently pin 12 of integrated circuit IC-1.

As described above, current flow in the tip circuit forward biases the phototransistor of optical coupler IC-4. This, in turn, forces pin 8 of integrated circuit IC-2 to logic "0" (−5 VDC) via pins 5 and 4 of optical coupler IC-4 and the −5 VDC bus. Pin 10 of integrated circuit IC-2 now becomes a logic "1." Since pin 10 of integrated circuit IC-2 is connected to pin 1 of integrated circuit IC-2, a logic "1" appears there as well.

A logic "0" now appears on pin 3 of integrated circuit IC-2, which is connected to pins 8 and 9 of integrated circuit IC-1. This produces a logic "1" at pin 10 of integrated circuit IC-1 and subsequently at pin 12 of integrated circuit IC-1. As stated above, pin 13 of integrated circuit IC-1 is already at logic "0". The presence of a logic "1" at pin 12 does not change the output at pin 11 of integrated circuit IC-1, it remains at logic "0", which keeps relay A operated via resistor R4 and transistor Q1. At this particular point, the −24 VDC at terminal A can be removed without affecting the operation of relay A. Pin 5 of integrated circuit IC-1 becomes a logic "1" after the removal of −24 VDC from terminal A, which causes pin 4 of integrated circuit IC-1 to become a logic "0." This in turn causes pin 13 of integrated circuit IC-1 to become a logic "0." However, since pin 12 of integrated circuit IC-1 is a logic "1" because of current flow through optical coupler IC-4, pin 11 of integrated circuit IC-1 remains at logic "0" which maintains the operation of relay A. In this manner the circuit is now self-latched. Only the breaking of the tip/ring current, or the introduction of resistor R7 into the base circuit of transistor Q1, will cause the deactivation of relay A. Diode D1 suppresses the inductive voltage generated when the current in relay A is interrupted.

Party line exclusion is activated when a normally open pushbutton 4 is depressed forcing pins 12 and 13 of integrated circuit IC-3 to ground potential (logic ""). The voltage divider formed by resistors R13 and R8 and the input impedance of the three NOR gates (pins 12, 13 and 5 of integrated circuit IC-3), normally keep pins 12 and 13 at −5 VDC (logic "0"). The output of this NOR gate, pin 11, is normally a logic "1" when pins 12 and 13 are logic "0."

The ground potential or logic "1" on pin 11 of integrated circuit IC-3 cut-off biases transistor Q2 via resistor R6. When pin 11 of integrated circuit IC-3 becomes a logic "0" (pins 12 and 13 are forced to a logic "1"), transistor Q2 is biased on, placing a low impedance to ground in series with resistor R3. This effectively places the resistance value of resistor R3 from the key terminal "A" lead of the associated line circuit card 5 to ground via the subset line switch 2 and terminal A. The circuitry contained in the party line exclusion line card 5 senses the presence of resistor R3 to ground and activates the exclusion circuits which then places the line card key terminal "A" lead at ground potential while sensing a short tone burst over the tip/ring conductor pair. At this point in time, the exclusion pushbutton 4 can be released as its operation is no longer necessary. When another subset selects the excluded line, ground potential will be present for its terminal A. Since −24 VDC is required to initiate the circuit, the connection of the tip and ring conductors will not be completed by activation of relay A. Thus, the other subset that selected the excluded line is effectively excluded from that line. The remote speaker cut-off relay (R.S.C.O.R.) circuit is connected to terminal B. Diode D3 spans terminals A and B of the exclusion circuit 6 and prevents −24 VDC, which is stored on the capacitors associated with the R.S.C.O.R. circuit, from inadvertently creating an "ON" condition at terminal A.

The "A" lead common of the CO/PBX portion of the associated subset 1 is connected to terminal M of circuit 6 through line switch 7. When the subset is not operated, pin 6 of integrated circuit IC-2 is held at ground potential (logic "1") via resistor R9. Pin 5 of integrated circuit IC-2 is held at −5 VDC (logic "0"). This condition creates a logic "0" NOR gate output at pin 4. As described earlier, this condition is responsible for the cut-off biasing of transistor Q1.

When the exclusion circuit is not operating, the relay contacts A-1 and A-2 are open which prevents current flow through the LED portion of optical coupler IC-4, which, in turn, is responsible for a logic "0" at pin 1 of integrated circuit IC-2. Since pin 8 of integrated circuit IC-3 is conneced to pin 1 of integrated circuit IC-2, a logic "0" appears there as well. Pin 9 of integrated circuit IC-3 is held at −5 VDC (logic "0"). This creates a logic "1" at this NOR gate output at pin 10 of integrated circuit IC-3. This logic "1" also appears at pin 6 of integrated circuit IC-3. When the exclusion button is not depressed, pin 5 of integrated circuit IC-3 is held at a logic "0" via resistor R8 and R13 plus the input impedance of the three NOR gates (pins 12, 13 and 5 of integrated circuit IC-3). This creates a logic "0" at pin 4 of integrated circuit IC-3 which is connected to pins 1 and 2 of integrated circuit IC-3. Pin 3 of integrated circuit IC-3 is at a logic "1" which cut-off biases the Darlington connected transistor pairs Q3 and Q4 via resistor R11. The non-active Darlington transistor pair creates a high impedance path between terminal N and terminal M of circuit 6.

When a CO/PBX (key) line button such as line switch 7 is depressed, −24 VDC is connected to terminal M via the CO/PBX line card "A" and the "A" lead contact of switch 7. The voltage divider formed by resistors R9 and R10 and NOR gate input impedance at pin 6 of integrated circuit IC-2 creates a −5 VDC (logic "0") at pin 6. Together with a logic "0" at pin 5 of integrated circuit IC-2, the NOR gate output of pin 4 of integraed circuit IC-2 becomes a logic "1."

Thus, pin 2 of integrated circuit IC-2 becomes a logic "1" since it is connected to pin 4 of integrated circuit IC-2. Since pin 1 of inegrated circuit IC-2 is at a logic "0" at this time, the output of this NOR gate is a logic "0" at pin 3 of integrated circuit IC-2. This, in turn, creates a logic "1" at pin 10 of integrated circuit IC-1 and a logic "0" at pin 11 of integrated circuit IC-1 which activates relay A via resistor R4 and transistor Q1. As described eariler, the activation of relay A completes the tip/ring path via contacts A-1 and A-2 with the subsequent activation of the optical coupler IC-4 which now creates a logic "1" at pins 10 and 1 of integrated circuit IC-2 and pin 8 of integrated circuit IC-3. This ensures that pin 12 of integrated circuit IC-1 will be maintained at a logic "1" if the −24 VDC level at terminal M is removed, but only as long as tip/ring current is allowed to flow through the optical coupler IC-4. The presence of a logic "1" at pin 8 of integrated circuit IC-3 now creates a logic "0" at the NOR gate output at pin 10 of integrated circuit IC-3. This logic "0" also appears at pin 6 of integrated circuit IC-3. As described earlier, a logic "0" appears on pin 5 of integrated circuit IC-3 when the exclusion button 4 is not depressed. The logic "0"'s at both pins 5 and 6 of integrated circuit IC-3 create a logic "1" at the output of pin 4 of integrated circuit IC-3 which is connected to pins 1 and 2 of integrated circuit IC-3 causing a logic "0" at pin 3 of integrated circuit IC-3. This condition forward biases the Darlington connected transistor pair Q3 and Q4 via resistor R11 which, in turn, places a low resistance path between terminals N and M. Since terminal N is connected to ground via the normally closed hold button contact 8, terminal M is effectively placed at ground potential, which connects a ground potential to the CO/PBX key line card via subset key line "A" lead and line switch 7.

This causes pin 4 of integrated circuit IC-2 to return to a logic "0," but since current flow through the optical coupler IC-3 produces a logic "1" at pin 1 of integrated circuit IC-2, the logic "0" at pin 11 of integrated circuit IC-1 will be maintained with the resulting operation of relay A. However, when a second subset attempts to select this particular CO/PBX line, its exclusion circuit terminal M will find a ground potential on the CO/PBX "A" lead. Since −24 VDC is necessary to initiate the closing of relay contacts A-1 and A-2, the presence of ground will prevent the completion of the tip/ring circuit since relay A is not energized which will effectively exclude the second subset.

When a party line is selected, the exclusion button 4 is depressed to initiate exclusion. But, when a CO/PBX line is selected, exclusion is automatic. The exclusion button 4 may be depressed to allow other parties to access the CO/PBX line. As before, when the exclusion button 4 is depressed, pins 12, 13 and 5 of integrated circuit IC-3 are forced to a logic "1." Since pin 6 of integrated circuit IC-3 is presently at a logic "0," pin 4 of integrated circuit IC-3 now becomes a logic "0." Thus, pins 1 and 2 of integrated circuit IC-3 become a logic "0." Then pin 3 of integrated circuit IC-3 becomes a logic "1" which cut-off biases the Darlington transistor pair Q3 and Q4. This creates a high impedance from ground via terminal N and hold button 8 to terminal M. Since DC current is no longer flowing to the CO/PBX card, terminal M goes to a −24 VDC potential, creating the condition required to initiate operation of other subset exclusion circuits that may be on the CO/PBX line.

When the exclusion button 4 is released, pin 5 of integrated circuit IC-3 goes back to a logic "0" which again causes pin 4 of integrated circuit IC-3 to become a logic "1" with the resulting forward biasing of transistors Q3 and Q4. This again places terminal M at ground, effectively excluding all subsets not presently on the line.

When a subset is switched from an active line to an excluded line, switch contact adjustment and short transition times may allow current to be maintained in the LED portion of optical coupler IC-4. This would allow the subset to break into an excluded conversation by virtue of the latching feature that is dependent on the operation of the optical coupler IC-4. However, when any line switches, such as switches 2 and 7 are closed, the normally open common chaining bar switch 9 of the line button assembly is momentarily closed. This switch is connected between terminal E (ground) and terminal D, and when closed it connects one end of resistor R7 to ground. This effectively discharges capacitor 5 to a level determined by the voltage divider formed by resistors R4 and R7. Since the value of resistor R7 is quite small in comparison to the value of resistor R4, the discharge level is for practical purposes a logic "1" which shuts off transistor Q1. When the chaining bar switch 9 is opened, capacitor C4 charges to a −5 VDC (logic "0") level via resistor R4. This RC time constant is greater than the line switch transition times, thus eliminating false operation of transistor Q1. When transistor Q1 shuts down, relay A is deactivated. Contacts A-1 and A-2 then open, interrupting the tip/ring current and deactivating optical coupler IC-4. With the exclusion circuit shut down, −24 VDC must be present at either terminal A or terminal M to reactivate the circuit.

If an excluded line has been selected, ground will be present at either of terminal A or terminal M. Therefore, the circuit will not activate and is effectively excluded.

Capacitors C1, C3 and C4 function as RF (radio frequency) filters. Resistors R12 and R14 form a voltage divider to create the −5 VDC supply from the incoming −24 VDC via terminal J. Terminal E receives key telephone system ground. Diode D4 protects against reverse polarity transients. Capacitor C2 holds pin 8 of integrated circuit IC-2 at a logic "0" when the circuit is activated, in spite of dial pulsing. Diode D2 protects the LED portion of optical coupler IC-5 against reverse voltages. −5 VDC is connected to pin 7 (not shown) of integrated circuits IC-1, IC-2 and IC-3. Also ground is connected to pin 14 (not shown) of integrated circuits IC-1, IC-2 and IC-3 on the exclusion circuit 6.

In the party line exclusion line circuit 5 balanced tip/ring subset operation is provided by a dual coil relay D. Voice signals developed across tip and ground conductors are coupled via capacitor C6 to resistor R18 and the armature of relay contact B-1. Contact D-1 completes the 10 VAC busy lamp circuit.

Paging is accomplished when an external ground path (via locator button 10) the relay R.S.C.O.R. in the subset, (terminals B and A of exclusion circuit 6, and line switch 2) plus cable resistance, is placed on the "A" lead (key) tab of circuit 5. Current flow is established to −24 VDC via the external path, resistor R17, the normally closed relay contact F-2, isolation diode D6 and the relay B coil. Current also flows via the normally closed relay contact B-3, isolation diode D7 and resistor R19 into the base of transistor Q5. Resistor R20 provides cut-off bias while diode D8 provides protection against reverse voltages. Transistor Q5 amplifies the base current and attempts to operate relay coil E via resistor R21. Diode D9 suppresses inductive voltage generated by relay coil E. The time delay circuit comprised of capacitor C5 and resistor R21, holds off the operation of relay E. Meanwhile, relay B operates and via contact B-3 the base current of transistor Q5 is interrupted. Since the operation of relay B is faster than the capacitor C5 and resistor R21 time constant, relay E does not operate. Diode D5 suppresses relay inductive voltages of relay B.

Contact B-1 transfers the subset tip voice signal circuit from the normally open contact G-1 to the input of the external paging amplifier 11. Contact B-2 connects ground to activate the paging amplifier 11 if required.

Exclusion is activated when a subset exclusion button 4 is depressed. This places the resistance of $R_3$ from ground to the "A" lead (key) tab of circuit 5. The resistance of $R_3$ does not allow sufficient current to operate relay B. Therefore, contact B-3 remains closed and a path to the base of transistor Q5 is maintained via isolation diode D7 and resistor R19. The resistance of $R_3$ to ground provides base current to activate transistor Q5. This base current is amplified by Q5 and operates relay E after a delay of approximately 75 milliseconds due to the action of capacitor C5 and resistor R21. The activation of relay E causes contact E-1 to connect ground to one and relay F coil. The other end of relay F coil is connected to −24 VDC via current limiting resistor R22 and contact D-2. Contact D-2 was activated by relay D when the subset went off-hook. Therefore, the operation of contact E-1 activates relay F. Relay F becomes self latched via contact F.1. Diode D10 suppresses inductive voltages generated by the coil of relay F. Contact F-1 also connects ground to a timing circuit which consists of resistor R23, capacitor C7 and relay G. When ground is connected via contact F-1 relay G is energized by the charging current of capacitor C7. As capacitor C7 charges, charging current falls below relay G's holding current, operating relay G for approximately 100 milliseconds. Resistor R23 provides a discharge path for capacitor C7 when the circuit is deactivated by opening of contact D-2. Diode D12 provides suppression of inductive voltages generated by the coil of relay G.

The 100 millisecond operation of relay G produces a tone burst which is coupled into the tip circuit from the output of a tone generator 12 via contact G-1, normally closed contact B-1 and capacitor C6. This tone burst indicates that exclusion is in effect in the party line system. Contact F-2 opens the relay B circuit and transistor Q5 circuit, and places ground potential at the "A" lead (key) tab of circuit 5. It is this ground potential at the "A" lead (key) tab that prevents the operation of the subset exclusion circuits that had not been off-hook on this particular party line prior to the activation of the subset exclusion button.

Tone generator 12 can be composed of any type of oscillator, plus a buffer amplifier 13 to prevent loading effects. The oscillator's frequency was chosen to be 750 hertz, although most any audible frequency will do.

The self-latched relay F is deactivated whenever all subsets go on-hook, which derivatives relay D and via contact D-2, removes −24 VDC from the relay F circuit. This causes relay F to deactivate in spite of its latched contact F-1.

While I have described above the principles of my invention in connection with specific apparatus it is to be clearly understood that this description is made only by way of example and not as a limitation to the scope of my invention as set forth in the objects thereof and in the accompanying claims.

I claim:

1. An exclusion system for a central office/private branch exchange (CO/PBX) system and a party line paging and intercom system, said CO/PBX system having an "A" lead, a tip conductor and a ring conductor and said party line system having an "A" lead, a tip conductor and a ring conductor comprising:
   first means coupled to said "A" lead of said party line system when said party line system is selected and responsive to a predetermined potential on said "A" lead of said party line system to coupled a tip conductor and a ring conductor of an associated subset to said tip and ring conductors of said selected party line system;
   wherein said first means is coupled to said 'A' lead of said CO/PBX system when said CO/PEX system is selected and is responsive to a predetermined potential on said 'A' lead of said CO/PBX system to couple to the tip conductor and the ring conductor of said associated subset to said tip and ring conductors of said selected CO/PBX system;
   second means coupled to said "A" lead of said party line system to manually generate a first exclusion potential for said party line system to exclude subsets not already connected to said party line system; and
   third means coupled to said "A" lead of said CO/PBX system responsive to a given potential on said "A" lead of said CO/PBX system to automatically produce a second exclusion potential on said "A" lead of said Co/PBX system to exclude subsets not already connected to said CO/PBX system.

2. An exclusion system according to claim 1, further including
   fourth means coupled to said "A" lead and said tip conductor of said party line system to enable a paging operation.

3. An exclusion system according to claim 2, wherein said a fourth means includes
   a relay coupled to said "A" lead of said party line system having at least one contact to connect a paging amplifier to said tip conductor of said party line system when said relay is activated by said predetermined potential on said "A" lead of said party line system.

4. An exclusion system according to claim 2, further including
   fifth means coupled to said "A" lead and said tip conductor of said party line system to produce a tone burst to indicate that exclusion is in effect in said party line system.

5. An exclusion system according to claim 4, wherein said fifth means includes
   a first relay coupled to said "A" lead of said party line having at least one normally open contact,
   a second relay coupled to said normally open contact, said second relay being energized when said normally open contact is closed when said first relay is energized by said first exclusion potential, and
   a third relay coupled to said second relay, said third relay being energized in response to said second relay being energized, said third relay having a normally open contact which connects said tip conductor of said party line system to an oscillator to provide said tone burst.

6. An exclusion system according to claim 4, wherein said first means includes
   an optical coupler coupled to said tip conductor of a selected one of said party line system and said CO/PBX system,
   a first transistor,
   a relay coupled as a collector load for said first transistor, said relay having a first contact to connect the ring conductor of said associated subset to said ring conductor of a selected one of said party line system and said CO/PBX system when said relay is energized and a second contact to connect the tip conductor of said associated subset to said optical coupled when said relay is energized, and
   first logic circuitry connected from said optical coupler to the base of said first transistor,
   said optical coupler and said first logic circuitry to latch said relay in an energized condition.

7. An exclusion system according to claim 6, wherein said first logic circuitry includes
a plurality of interconnected NOR gates.

8. An exclusion system according to claim 6, wherein said second means includes
a second transistor having its collector connected to said "A" lead of said party line system,
second logic circuitry having its output connected to the base of said second transistor,
ground potential, and
a pushbutton to connect said ground potential to at least two inputs of said second logic circuitry to cause said second transistor to place ground potential on said "A" lead of said party line system to provide said first exclusion potential.

9. An exclusion circuit according to claim 8, wherein said second logic circuitry includes
a single NOR gate.

10. An exclusion system according to claim 8, wherein
said third means includes
a Darlington connected transistor pair coupled to said "A" lead of said CO/PBX system and ground potential, and
third logic circuitry coupled to said Darlington connected transistor pair, said pushbutton and said first logic circuitry to control the operation of said Darlington connected transistor pair and to maintain the latch on said relay, conduction of said Darlington connected transistor pair couples said ground potential to said "A" lead of said CO/PBX system as said second exclusion potential.

11. An exclusion system according to claim 10, wherein
said third logic circuitry includes
a plurality of interconnected NOR gates.

12. An exclusion system according to claim 1, further including
fourth means coupled to said "A" lead and said tip conductor of said party line system to produce a tone burst to indicate that exclusion is in effect in said party line system.

13. An exclusion system according to claim 12, wherein
said fourth means includes
a first relay coupled to said "A" lead of said party line having at least one normally open contact,
a second relay coupled to said normally open contact, said second relay being energized when said normally open contact is closed when said first relay is energized by said first exclusion potential, and
a third relay coupled to said second relay, said third relay being energized in response to said second relay being energized, said third relay having a normally open contact which connects said tip conductor of said party line system to an oscillator to provide said tone burst.

14. An exclusion system according to claim 12, wherein
said first means includes
an optical coupler coupled to said tip conductor of a selected one of said party line system and said CO/PBX system,
a first transistor,
a relay coupled as a collector load for said first transistor, said relay having a first contact to connect the ring connector of said associated subset to said ring conductor of a selected one of said party line system and said CO/PBX system when said relay is energized and a second contact to connect the tip conductor of said associated subset to said optical coupled when said relay is energized, and
first logic circuitry connected from said optical coupler to the base of said first transistor,
said optical coupler and said first logic circuitry to latch said relay in an energized condition.

15. An exclusion system according to claim 14, wherein
said first logic circuitry includes
a plurality of interconnected NOR gates.

16. An exclusion system according to claim 14, wherein
said second means includes
a second transistor having its collector connected to said "A" lead of said party line system,
second logic circuitry having its output connected to the base of said second transistor,
ground potential, and
a pushbutton to connect said ground potential to at least two inputs of said second logic circuitry to cause said second transistor to place ground potential on said "A" lead of said party line system to provide said first exclusion potential.

17. An exclusion system according to claim 16, wherein
said second logic circuitry includes
a single NOR gate.

18. An exclusion system according to claim 16, wherein
said third means includes
a Darlington connected transistor pair coupled to said "A" lead of said CO/PBX system and ground potential, and
third logic circuitry coupled to said Darlington connected transistor pair, said pushbutton and said first logic circuitry to control the operation of said Darlington connected transistor pair and to maintain the latch on said relay, conduction of said Darlington connected transistor pair couples said ground potential to said "A" lead of said CO/PBX system as said second exclusion potential.

19. An exclusion system according to claim 18, wherein
said third logic circuitry includes
a plurality of interconnected NOR gates.

20. An exclusion system according to claim 1, wherein
said first means includes
an optical coupler coupled to said tip conductor of a selected one of said party line system and said CO/PBX system,
a first transistor,
a relay coupled as a collector load for said first transistor, said relay having a first contact to connect the ring conductor of said associated subset to said ring conductor of a selected one of said party line system and said CO/PBX system when said relay is energized and a second contact to connect the tip conductor of said associated subset to said optical coupler when said relay is energized, and first logic circuitry connected from said optical coupler to the base of said first transistor,
said optical coupler and said first logic circuitry to latch said relay in an energized condition.

21. An exclusion system according to claim 20, wherein
said first logic circuitry includes
a plurality of interconnected NOR gates.

22. An exclusion system according to claim 20, wherein
said second means includes
a second transistor having its collector connected to said "A" lead of said party line system,
second logic circuitry having its output connected to the base of said second transistor,
ground potential, and
a pushbutton to connect said ground potential to at least two inputs of said second logic circuitry to cause said second transistor to place ground potential on said "A" lead of said party line system to provide said first exclusion potential.

23. An exclusion system according to claim 22, wherein
said second logic circuitry includes
a single NOR gate.

24. An exclusion system according to claim 22, wherein
said third means includes
a Darlington connected transistor pair coupled to said "A" lead of said CO/PBX system and ground potential, and
third logic circuitry coupled to said Darlington connected transistor pair, said pushbutton and said first logic circuitry to control the operation of said Darlington connected transistor pair and to maintain the latch on said relay, conduction of said Darlington connected transistor pair couples said ground potential to said "A" lead of said CO/PBX system as said second exclusion potential.

25. An exclusion system according to claim 24, wherein
said third logic circuitry includes
a plurality of interconnected NOR gates.

26. An exclusion system according to claim 1, wherein
said second means includes
a transistor having its collector connected to said "A" lead of said party line system,
first logic circuitry having its output connected to the base of said transistor,
ground potential, and
a pushbutton to connect said ground potential to at least two inputs of said first logic circuitry to cause said transistor to place ground potential on said "A" lead of said party line system to provide said first exclusion potential.

27. An exclusion system according to claim 26, wherein
said first logic circuitry includes
a single NOR gate.

28. An exclusion system according to claim 26, wherein
said third means includes
a Darlington connected transistor pair coupled to said "A" lead of said CO/PBX system and ground potential, and
second logic circuitry coupled to said Darlington connected transistor pair, said pushbutton and said first logic circuitry to control the operation of said Darlington connected transistor pair, conduction of said Darlington connected transistor pair couples said ground potential to said "A" lead of said CO/PBX system as said second exclusion potential.

29. An exclusion system according to claim 28, wherein
said second logic circuitry includes
a plurality of interconnected NOR gates.

30. An exclusion system according to claim 1, wherein
said third means includes
a Darlington connected transistor pair coupled to said "A" lead of said CO/PBX system and ground potential, and
logic circuitry coupled to said Darlington connected transistor pair to control the operation of said Darlington connected transistor pair, conduction of said Darlington connected transistor pair couples said ground potential to said "A" lead of said CO/PBX system as said second exclusion potential.

31. An exclusion system according to claim 30, wherein
said logic circuitry includes
a plurality of interconnected NOR gates.

* * * * *